United States Patent [19]

Watanabe

[11] 4,048,511
[45] Sept. 13, 1977

[54] AUTOMATIC OUTPUT CONTROL METHOD AND DYNAMO EQUIPMENT FOR GENERATING SETS USING AUTOMOBILE WHEEL FRICTION DRIVE

[76] Inventor: Tsuguhiko Watanabe, 5-13, 1-chome, Ebara-cho, Nakano, Tokyo, Japan

[21] Appl. No.: 619,685

[22] Filed: Oct. 3, 1975

Related U.S. Application Data

[63] Continuation-in-part of Ser. No. 499,483, Aug. 22, 1974, Pat. No. 3,943,370.

[30] Foreign Application Priority Data

Aug. 25, 1975 Japan ................................ 50-102221

[51] Int. Cl.² .............................................. H02P 9/04
[52] U.S. Cl. ..................................... 290/1 R; 322/40
[58] Field of Search ................................... 322/40–43, 322/1; 310/75; 290/1

[56] References Cited

U.S. PATENT DOCUMENTS

| 2,233,039 | 2/1941 | Uanzone | 310/75 C |
| 2,716,728 | 8/1955 | Lester | 322/40 |
| 3,943,370 | 3/1976 | Watanabe | 290/1 R |

FOREIGN PATENT DOCUMENTS

| 889,773 | 1/1943 | France | 310/75 C |
| 945,333 | 4/1947 | France | 310/75 C |

Primary Examiner—Robert K. Schaefer
Assistant Examiner—J. W. Redman
Attorney, Agent, or Firm—Saul Jecies

[57] ABSTRACT

An automatic output control method and dynamo equipment for generating sets using automobile wheel friction drive, which, in relation to generating sets using automobile wheel friction drive and consisting of a base plate with a jack attached and a dynamo which is removable from the said base plate and tiltable so that its shaft bears upon an automobile wheel driven by the automobile engine to achieve electricity generation over long periods of time with good efficiency and stability by utilizing the said automobile engine power, features the use of a tapered drum having a parallel section for the dynamo drum driven by friction with an automobile wheel, arranged so that the said tapered drum, sliding freely in the axial direction along a screw groove notched along the shaft, and so that a coil spring fits around the said shaft in such a manner that the tapered drum may be pressed always in the direction of the smaller diameter section by the elastic tension, that the revolution of the tapered drum may be transmitted to the shaft at a position of the screw groove corresponding to the stress within the said coil spring, and so that the tapered drum may travel in the axial direction due to the free rotation occurring between the tapered drum and the shaft to change the contact surface between the tapered drum and the automobile wheel, thus making it possible both to absorb changes in the driving force required for the changes in load which occur during the operation of the said dynamo automatically by means of changes in the revolution ratio due to differences in the circumference caused by the changing contact surface, and also to maintain the changing driving force required to turn the dynamo always at a constant rate with the changes in load against the constant driving force provided by the automobile wheel.

5 Claims, 5 Drawing Figures

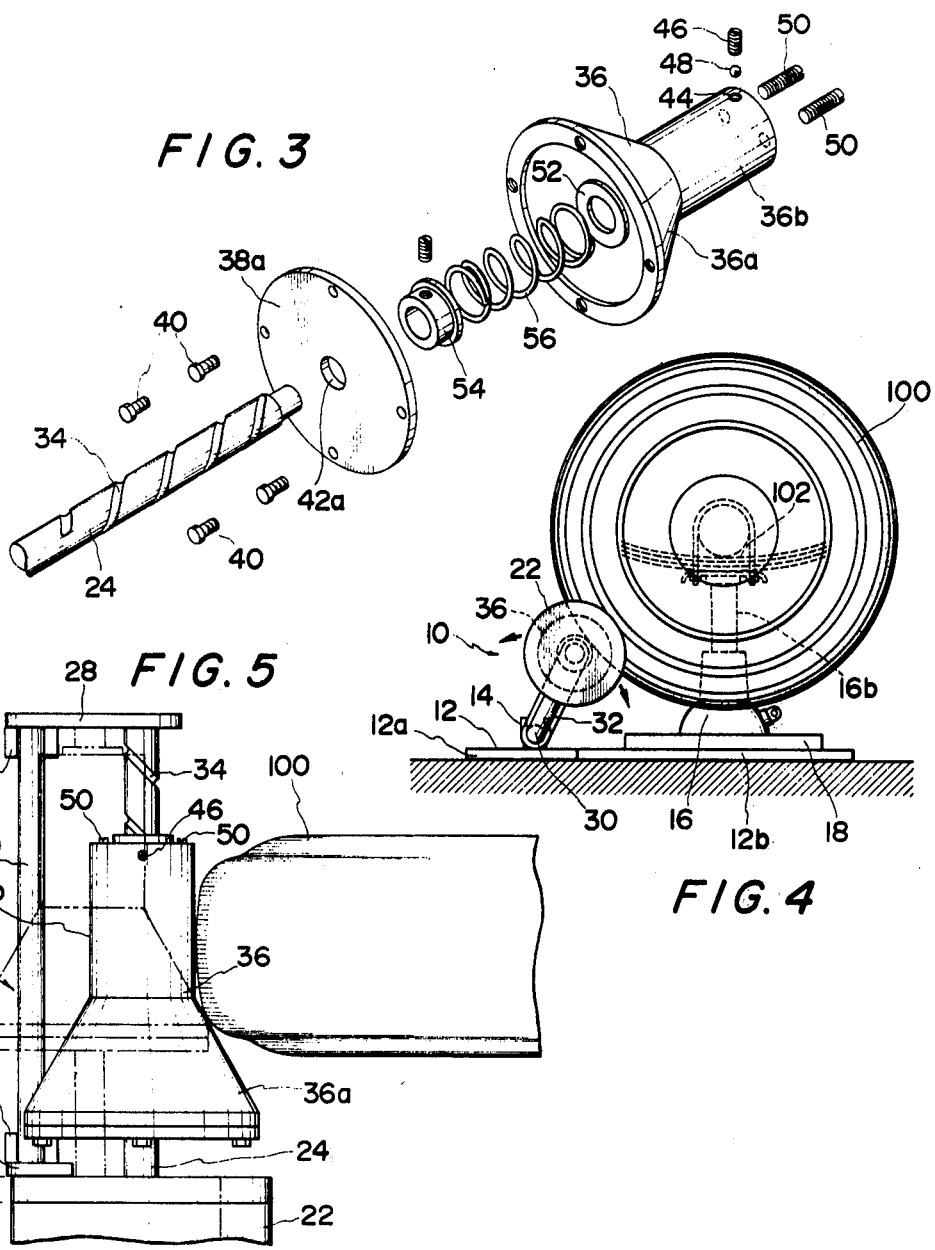

AUTOMATIC OUTPUT CONTROL METHOD AND DYNAMO EQUIPMENT FOR GENERATING SETS USING AUTOMOBILE WHEEL FRICTION DRIVE

The present application is a continuation-in-part of the co-pending application Ser. No. 499,483 filed Aug. 22, 1974, now U.S. Pat. No. 3,943,370 granted Mar. 9, 1976.

BACKGROUND OF THE INVENTION

The present invention relates to an improved method of automatic output control and equipment for generating sets using automobile wheel friction drive type where a dynamo is rotated to generate electricity by an automobile driving wheel.

Conventional generating sets of this kind, having neither a linked engine nor its ancillaries, are generally of very simple construction and are both conveniently portable and durable in comparison with portable models fitted with an engine. Furthermore, as compared with those which are fitted with an engine, generating sets using friction drive from automobile engines as the driving force are advantageous not only in terms of environmental problems (since automobile engines have quite advanced silencing and incorporate similarly advanced exhanst gas antipollution measures) but also make it possible to operate the dynamo with a considerable reserve of output power.

Still, in such conventional generation sets using automobile wheel friction drive, since the dynamo shaft is friction driven in direct contact with a driving wheel, the rate of revolution, and ultimately the output of the dynamo, decrease with increasing loads. It is impossible, therefore, to obtain a stable output. Namely, since adjustment of the engine output and driving force when automobiles are being used is carried out by the gear box and by accelerator pedal operation so as to achieve the desired effect, the user must rely upon a driver to operate the accelerator according to the changing load so that rate of rotation of the said dynamo may be kept always at a constant rate. This is quite inconvenient and virtually impracticable. Again, it is very dangerous for the user always to be seated in the automobile while it is jacked up during operation of the generating set. For this reason, too, generating sets provided with some such equipment as the abovementioned are needed to obtain a constantly stable output by controlling and absorbing automatically the changes in load.

SUMMARY OF THE INVENTION

In view of the foregoing defects, the first purpose of the present invention is to offer an automatic output control method and equipment for generating sets using automobile wheel friction drive which can control the rate of rotation automatically so as to obtain an always stable output despite changing loads.

The second purpose of the present invention is to offer a generating set using automobile wheel friction drive incorporating the said automatic output control equipment.

The third purpose of the present invention is to offer a generating set using automobile wheel friction drive which may be attached easily to an automobile driving wheel and may be detached from it simply after use.

The fourth purpose of the present invention is to offer a generating set using automobile wheel friction drive which may be split into a separate base plate and generator so as to split its weight also for convenience in transportation.

An additional purpose of the present invention is to offer a low cost generating set using automobile wheel friction drive which has an extremely simple construction.

To achieve the said purposes in the present invention, an L-shaped flat plate is used as the base plate with a jack attached and the said base plate is placed under one of the driving wheels of an automobile. Then, in order that the driving wheel may revolve freely, it is lifted with a jack attached on the base plate. A dynamo is attached to the other end of the said base plate, tilting freely, and a tapered drum is arranged, which is fitted to a screw groove cut along the shaft of the said dynamo so as to enable the tapered drum to travel in the axial direction while revolving freely and being pressed towards its smaller diameter section by the tensile force of a coil spring built-in between the said tapered drum and the shaft. In a generating set with this construction, electricity may be generated by pressing the tapered drum of the said dynamo to the said driving wheel while turning it by the automobile engine.

When the dynamo load changes, therefore, the tapered drum revolves freely while compressing the built-in coil spring due to the screw action and travels in the axial direction so as to change the part in contact with the driving wheel and ultimately the revolution ratio, thus making it possible to correct the rate of revolution and to achieve stable electrical generation for long periods of time. As a result, irrespective of the load, provided only that the user engages a high gear-ratio of the automobile transmission to drive the engine, the rate of revolution of the dynamo may be controlled automatically, without any other manual operation, to maintain a constant output.

Furthermore, since a dynamo of the said construction revolves without bearing any load from the automobile body weight and since the driving wheel of the automobile is revolving freely, the drive may be commenced in a high gear ratio from the start. As a result, the electricity generation may be achieved with reduced engine noise and fuel consumption. The base plate is made in an L-shape and it may be readily placed under a driving wheel, while the dynamo is made so that it is freely detachable from the base plate and the generating set may be split also in weight for convenience in transportation. In addition, since the said generating set is extremely simple in construction, it becomes feasible to offer low cost generating sets of this kind.

The abovementioned and other purposes, characteristics and performance of the present invention will be clarified by the following description of an application example, referring to the drawings attached.

BRIEF DESCRIPTION OF THE DRAWINGS

FIG. 3 represents sections of disassembled parts of the automatic output control equipment.

FIG. 4 represents a front view of the equipment of the present invention as it is fitted to an automobile driving wheel.

FIG. 5 shows how the equipment of the present invention works.

DESCRIPTION OF A PREFERRED EMBODIMENT

Figure 1:
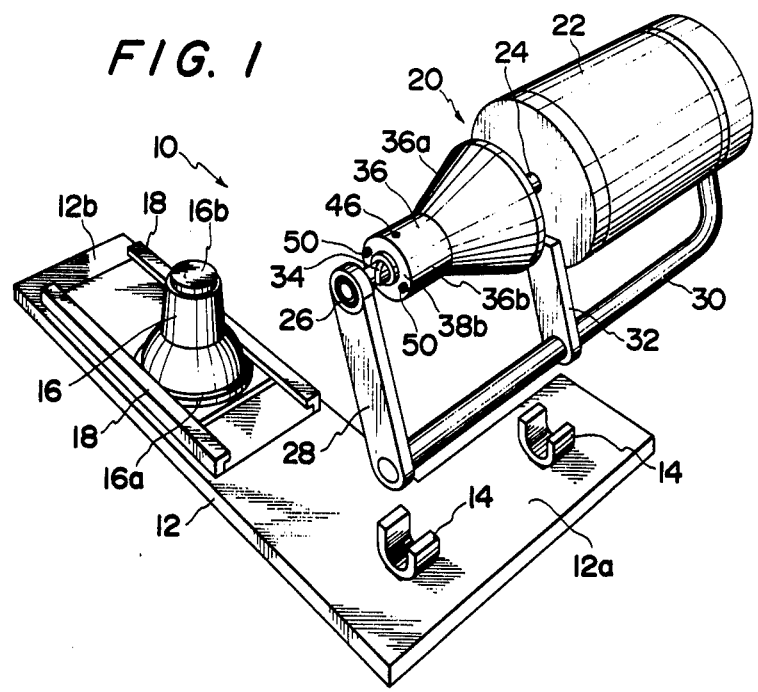
FIG. 1 represents a diagonal view of an application example of a generating set using automobile wheel friction drive provided with the automatic output control equipment of the present invention.

As an example of a generation set 10 provided with the automatic output control equipment of the present invention, the diagonal view of FIG. 1 shows separately a base plate 12 and a dynamo part 20 to be attached, removably and tilting freely, to the said base plate.

The base plate 12 is a flat, L-shaped plate member consisting of a main plate part 12a and a side plate part 12b. In order to minimize the weight of the base plate 12 for convenience in transportation, it is preferable to make the base plate hollow by using thin sheet-steel as the structural material, or to provide for weight-reducing holes.

The main plate part 12a of the said base plate 12 is provided with U-shaped bearing members 14 for attaching the dynamo part 20, removably and tilting freely. The pair of U-shaped bearing members 14 are fixed by welding or other means so as to be coaxial.

The side plate part 12b is attached to a jack 16, which is movable along parallel guide frames 18, fixed to the side plate part 12b, for the stool part 16a of the jack 16.

Therefore, the jack 16 may be shifted to any desired position on the said plate part 12b prior to the raising-and-lowering operation of its expanding part 16b. The said jack 16, however, need not necessarily be used while attached to the base plate 12. Alternatively, it 16 may also be used, without the said guide frames 18, merely being placed at the desired position on the side plate part 12b.

Figure 2:
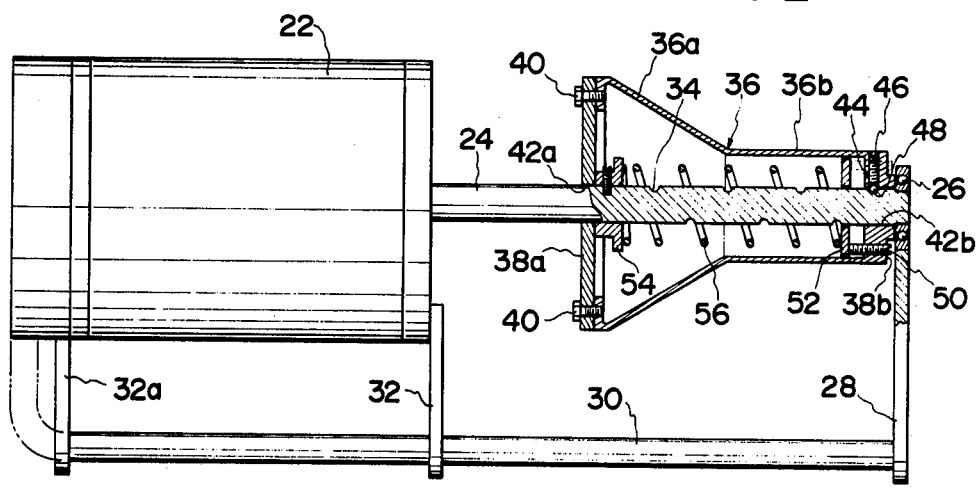
FIG. 2 represents a cutaway view of the dynamo.

As seen in FIG. 2, in the said dynamo part 20, the dynamo 22 provided with an output terminal such as a plug socket (not shown in the figure) has a shaft 24, protruding beyond one end of its case, the top end of which is supported, revolving freely, by a bracket 28 through the medium of a bearing 26.

While, a supporting lever 30 fixed by welding or other means to the back end side of the dynamo case 22 is bent at a suitable position along the length parallel to the said shaft 24, penetrating through one end of the bracket 32, which is fixed at the other end to the front end of the dynamo case 22, and is fixed to one end of the aforementioned bracket 28. This supporting lever 30 is made of round rod or hollow tube and the distance between the said two brackets 28 32 is taken so as to fit the U-shaped bearing members 14 of the said base plate 12 without giving rise to any slip in the axial direction. The supporting lever 30 may also be fixed by means of another bracket 32a extending from the back end.

Next, a screw groove 34 with a pitch almost identical to the diameter of the shaft 24 is cut along about half the length at the top of the said protruding shaft 24 and a tapered drum 36 is fitted around the shaft 24. The said tapered drum 36 consists of a tapered tubular part 36a, a parallel tube part 36b and side plates 38a 38b of the respective tube parts 36a 36b. The tapered tube part side plate 38a is locked with bolts 40 and has a shaft hole 42a, through which the said shaft 24 penetrates, revolving freely.

The parallel tube part side plate 38b has a shaft hole 42 bored at the center and a female screw 44 threaded from the circumference towards the axial center. A bolt 46 in the said screw 44 supports a steel ball 48, which is half recessed into the screw groove 34 cut along the said shaft 24 so that the steel ball 48 may travel along the screw groove 34 when the tapered drum revolves freely.

The said parallel tube part side plate 38b is provided also with female screw threads in the axial direction, through which bolts 50 attached to disk-like rings 52 at the inner end are driven. A coil spring 56 fitted around the shaft 24 is arranged between the said adjusting rings 52 and a stop member 54 fixed at the center part of the shaft 24 so as to give an elastic tension, which may be adjusted as required by moving the adjusting rings back and forth by turning the adjusting bolts 50.

The tapered tube part 36a and the parallel tube part 36b of the tapered drum 36 may preferably be coated with rubber or other materials having a large frictional coefficient at the outer circumference or be provided with fine texture unevenness so as to improve the frictional drive efficiency or the automobile driving wheel.

The generating set 10 using automobile wheel friction drive provided with the automatic output control equipment constructed as above according to the present invention is applied as described below:

Namely, as seen in FIG. 4, after all wheels (not shown in the Figure) of a stopped automobile, except for one driving wheel, are fixed firmly, the base plate is placed under the driving wheel which has not been fixed 100 so as to orient the main plate part 12a along the travelling direction of the driving wheel 100 and the side plate part 12b on the inner side and so as to bring the expanding part 16b of the jack 16 attached to the base plate 12 opposite some suitable part, such as the suspension spring 102, of the automobile.

Next, in this condition, the suspension spring part 102 of the automobile is lifted with the head of the expanding part 16b by operating the handle (not shown in the figure) of the jack 16 and thus the driving wheel 100 is suspended. Then, the supporting lever 30 of the dynamo part 20 is fitted to the U-shaped bearing members 14 of the base plate 12 so as to connect the dynamo part 20, tilting freely, to the base plate 12.

After that, the dynamo part 20 is brought down to the driving wheel 100 side suspended by the jack 16 and the contact position is adjusted by raising or lowering the said jack 16 so as to enable the tapered tube part 36a and the parallel tube part 36a of the taper drum 36 to achieve friction drive from the driving wheel 100.

Then, as the driving wheel 100 is rotated by the automobile engine in the direction to draw the tapered drum 36 the said tapered drum 36 is rotated by the friction with the driving wheel 100 and the revolution is transmitted to the screw groove 34 through the medium of the steel ball 48, so that the shaft 24 of the dynamo 22 may revolve, thus achieving electricity generation.

Next, referring to FIGS. 2 and 5, a further description will be given of the performance and effects of the automatic output control equipment.

Until the friction driven is engaged, the driving wheel 100 is in contact with the tapered tube part 36a of larger diameter as shown by the two-point broken line in FIG. 5. When the drive is engaged, the tapered drum 36 revolves freely against the elasticity of the coil spring 56 due to the inertia of the dyanmo 22. The tapered drum 36, therefore, slips in the axial direction due to the screw action of the screw groove 34 and is moved towards the position indicated by the unbroken line. As the rate of revolution is stabilized, however, the contacting surface for the friction drive comes back to the position indicated by the two-point broken line due to the tension in the said coil spring 56. Namely, the friction drive continues in the position where the tension of the coil spring 56 is balanced with the compression of the tapered drum 36 travelling the screw groove 34 due to slip occurring between the shaft 24 and the tapered drum 36.

When the dynamo 22 is subjected to a load and the rate of revolution of the shaft 24 slows down, however, slip will again take place between the shaft and the tapered drum 36 and the tapered drum 36 will move towards the position indicated by the unbroken line, so that the contact surface with the driving wheel 100 will shift to the smaller diameter section.

Due to this action, when the dynamo 22 is subject to a load and both the rate of revolution of the shaft 24 and ultimately the revolution rate of the automobile driving wheel 100 are lowered, the revolution ratio of the driving wheel 100 and the tapered drum 36 may be corrected according to the lowered rate of revolution of the driving wheel 100; thus the rate of revolution of the shaft 24 and ultimately the output are kept constant and stable.

Since the driving wheel 100 takes up a position in such a manner between the positions indicated by the unbroken line and two-point broken lines, respectively, i.e., the parallel tube part 36b of the tapered drum 36 and the largest diameter part of the tapered tube part 36a, it becomes possible always to give a stable output despite the changing load.

As stated above, the dynamo 10 friction driven by an automobile driving wheel 100 may be operated for a stable output preferably with a high gear ratio. This makes it possible to carry out electricity generation with high efficiency and stability while keeping the engine noise and fuel consumption at a low level.

Next, in order to remove the equipment 10 from the automobile after the generating operation is finished, the tapered drum 36 is detached first from the driving wheel 100 and the supporting lever 30 is removed from the U-shaped bearing members 14 of the base plate 12, then the driving wheel 100 is lowered to the ground by lowering the expanding part 16b of the jack 16. After that, the base plate 12 under the automobile is withdrawn and the base plate 12 and the dynamo part 20 are carried to a stipulated place, respectively. In this way, the equipment 10 may be carried simply and conveniently by hand.

In addition, when the coil spring 56 arranged around the shaft 24 deteriorates during use or when a deviation is found from the designed displacement due to variations in the intrinsic spring constant, the tension in the coil spring 56 may be adjusted by turning the adjusting bolts 50 arranged at the parallel tube part side plate 38b of the tapered drum 36 of the dynamo part 20 so as to move the adjusting rings 52 back and forth.

Although the above description is made with respect to a preferred embodiment, it is clear that a number of variations and modifications may be practiced without deviating from the priciples of the present invention. We hope, therefore, that the following scope of the patent claims will cover all such variations and modifications that may produce substantially the effects of the present invention by using equipment substantially identical or equivalent to that characterizing the present invention.

What is claimed is:

1. An automatic output control method for dynamos of generating sets using automobile driving wheel friction drive relating to generating sets where electricity generation is achieved by rotating the dynamo shaft in contact with a driving wheel of an automobile, and featuring a drum driving the dynamo by friction from the automobile wheel, the drum being tapered and having a parallel part so as to permit the displacement of the said tapered drum in the axial direction due to the screw action as it revolves freely against the shaft of said dynamo, where the said displacement is deliberately controlled by means of a coil spring incorporated between the said shaft and the tapered drum so as to transmit the driving force, so that, in the operation of the said dynamo, changes in the automobile driving force required for the driving changing load of the dynamo are absorbed automatically by the changing revolution ratio due to differences in the circumference as the said tapered drum moves in the axial direction and so that the changing driving force required for the dynamo under the changing load conditions is continuously maintained at a constant rate or rotation for a given frictional drive force from the automobile wheel.

2. Automatic output control equipment for dynamos of generating sets using automobile wheel friction drive featuring the displacement of the friction driven part in contact with the automobile wheel during the generating operation and the incorporation of a screw groove cut along about half the length at the outer end of the dynamo shaft which protrudes for a suitable distance, a tapered drum having a parallel tubular section arranged around the said shaft, revolving freely, a steel ball fitted to the said screw groove so that the tapered drum may travel back and forth along the shaft, and a coil spring fitted around the shaft between the said tapered drum and a stop member fixed at the center part of the said shaft so that displacement of the tapered drum occurring due to the screw action as it revolves freely against the said shaft may be adjusted appropriately by the elasticity of the spring coil.

3. A generating set using automobile wheel friction drive according to claim 2 provided with a base plate to which a jack is attached or upon which it may be mounted, bearing members which are fixed at certain stipulated positions on the said base plate, and a supporting lever which is held, removably and tilting freely, by the said bearing members, in addition to the automatic output control equipment as stated above in claim 2, in order to achieve stable dynamo operation.

4. An elastic stress-adjusting mechanism of the automatic output control equipment as stated above in claim 2, where the elastic stress of a coil spring fitted around the shaft between a stop member and disk-like adjusting rings is adjusted appropriately by adjusting bolts, which, being driven through female screws threaded into a side plate of the tapered drum, are movable back and forth in the axial direction, and the said ajusting rings being arranged at the head of the adjusting bolts.

5. Equipment as stated above in claim 2, where the tapered drum of a dynamo rotating in contact with a driving wheel of an automobile is coated at the outer circumference with a material having a high coefficient of friction or is provided with fine-texture unevenness so that increased frictional drive efficiency may be achieved between the driving wheel and the tapered drum.

* * * * *